(12) United States Patent
Roitman et al.

(10) Patent No.: US 11,238,076 B2
(45) Date of Patent: Feb. 1, 2022

(54) DOCUMENT ENRICHMENT WITH CONVERSATION TEXTS, FOR ENHANCED INFORMATION RETRIEVAL

(71) Applicant: International Business Machines Corporation, Armonk, NY (US)

(72) Inventors: Haggai Roitman, Yoknea'm Elit (IL); Shai Erera, Gilon (IL); Doron Cohen, Gilon (IL); Yosi Mass, Ramat Gan (IL); Or Rivlin, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 16/852,483

(22) Filed: Apr. 19, 2020

(65) Prior Publication Data
US 2021/0326369 A1 Oct. 21, 2021

(51) Int. Cl.
*G06F 16/35* (2019.01)
*G06F 16/33* (2019.01)
*G06F 16/93* (2019.01)
*H04L 12/58* (2006.01)
*H04L 29/08* (2006.01)

(52) U.S. Cl.
CPC ........ *G06F 16/3344* (2019.01); *G06F 16/353* (2019.01); *G06F 16/93* (2019.01); *H04L 51/02* (2013.01); *H04L 51/12* (2013.01); *H04L 51/16* (2013.01); *H04L 67/02* (2013.01)

(58) Field of Classification Search
CPC .... G06F 16/3344; G06F 16/353; G06F 16/93; G06F 16/22; G06F 16/45; G06F 16/35; G06F 16/3329; H04L 51/02; G06N 20/00
See application file for complete search history.

(56) References Cited

U.S. PATENT DOCUMENTS

| 9,262,175 B2 | 2/2016 | Lynch |
| 2005/0138007 A1 | 6/2005 | Amitay |
| 2014/0122083 A1 | 5/2014 | Xiaojiang |
| 2015/0179168 A1 | 6/2015 | Hakkani-Tur |

(Continued)

OTHER PUBLICATIONS

Amita et al., "Queries as Anchors: Selection by Association," HT'05, Sep. 6, 2005.

(Continued)

*Primary Examiner* — Hau H Hoang
(74) *Attorney, Agent, or Firm* — Dvir Gassner (57) ABSTRACT

A method including: Obtaining multiple conversation texts, one text per conversation, wherein each of the multiple conversation texts comprises: multiple messages authored by multiple parties, and a reference to an electronic document that provides resolution of a problem that is common to all the conversations. Calculating an importance score for each of the multiple messages of all the conversation texts. Clustering the multiple messages of all the conversation texts into multiple bins. Calculating an aggregated importance score for each of the multiple bins, based on the importance scores of the messages contained in the respective bin. Enriching (a) the electronic document, or (b) a record of the electronic document in an index of electronic documents, with at least some of the multiple bins and their aggregated importance scores, wherein the at least some of the multiple bins are added as fields to the electronic document or to the record.

19 Claims, 3 Drawing Sheets

(56) References Cited

U.S. PATENT DOCUMENTS

| | | |
|---|---|---|
| 2019/0012373 A1 | 1/2019 | Malik |
| 2019/0182382 A1 | 6/2019 | Mazza |
| 2020/0349199 A1* | 11/2020 | Jayaraman ............ G06F 40/216 |
| 2021/0034815 A1* | 2/2021 | Hoshino ................. G06F 40/35 |

OTHER PUBLICATIONS

IBM, "Personalized chatbot service," An IP.com Prior Art Database Technical Disclosure No. IPCOM000181584D. Apr. 6, 2009.
Metzler et al., "Buiding Enriched Document Representations using Aggregated Anchor Text," SIGIR '09, Jul. 19, 2009.
Mishne et al., "Twanchor Text: A Preliminary Study of the Value of Tweets as Anchor Text," SIGIR '12, Aug. 12, 2012.

* cited by examiner

DOCUMENT ENRICHMENT WITH CONVERSATION TEXTS, FOR ENHANCED INFORMATION RETRIEVAL

BACKGROUND

The invention relates to the field of computerized information retrieval.

Information retrieval systems typically operate by receiving a query and searching for pertinent information in a corpus of digital data—be it text, images, audio, video, or any other type of data. For example, Web search engines receive user queries and search for respective information in the World Wide Web. Technically, the searches are conducted in a centralized index of the World Wide Web maintained by each search engine, to facilitate near real-time provision of search results.

Information retrieval systems use a variety of techniques to ensure that their searches return results that are highly-relevant to the queries. Some techniques focus on the contents of searched documents as a source for information relevant to the query, while others focus on contextual information that is associated with the searched documents, such as anchor texts in HTML (HyperText Markup Language) documents on the World Wide Web. A survey of such techniques can be found in the seminal work of S. Brin and L. Page, "The anatomy of a large-scale hypertextual Web search engine," Computer Networks and ISDN Systems 30 (1998) 107-117.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a method which includes: Obtaining multiple conversation texts, one text per conversation, wherein each of the multiple conversation texts comprises: multiple messages authored by multiple parties, and a reference to an electronic document that provides resolution of a problem that is common to all the conversations. Calculating an importance score for each of the multiple messages of all the conversation texts. Clustering the multiple messages of all the conversation texts into multiple bins. Calculating an aggregated importance score for each of the multiple bins, based on the importance scores of the messages contained in the respective bin. Enriching (a) the electronic document, or (b) a record of the electronic document in an index of electronic documents, with at least some of the multiple bins and their aggregated importance scores, wherein the at least some of the multiple bins are added as fields to the electronic document or to the record.

Another embodiment is directed to a system which comprises: (a) at least one hardware processor; and (b) a non-transitory computer-readable storage medium having program code embodied therewith, the program code executable by said at least one hardware processor to: Obtain multiple conversation texts, one text per conversation, wherein each of the multiple conversation texts comprises: multiple messages authored by multiple parties, and a reference to an electronic document that provides resolution of a problem that is common to all the conversations. Calculate an importance score for each of the multiple messages of all the conversation texts. Cluster the multiple messages of all the conversation texts into multiple bins. Calculate an aggregated importance score for each of the multiple bins, based on the importance scores of the messages contained in the respective bin. Enrich (i) the electronic document, or (ii) a record of the electronic document in an index of electronic documents, with at least some of the multiple bins and their aggregated importance scores, wherein the at least some of the multiple bins are added as fields to the electronic document or to the record.

A further embodiment is directed to a computer program product comprising a non-transitory computer-readable storage medium having program code embodied therewith, the program code executable by at least one hardware processor to: Obtain multiple conversation texts, one text per conversation, wherein each of the multiple conversation texts comprises: multiple messages authored by multiple parties, and a reference to an electronic document that provides resolution of a problem that is common to all the conversations. Calculate an importance score for each of the multiple messages of all the conversation texts. Cluster the multiple messages of all the conversation texts into multiple bins. Calculate an aggregated importance score for each of the multiple bins, based on the importance scores of the messages contained in the respective bin. Enrich (i) the electronic document, or (ii) a record of the electronic document in an index of electronic documents, with at least some of the multiple bins and their aggregated importance scores, wherein the at least some of the multiple bins are added as fields to the electronic document or to the record.

In some embodiments, the method further comprises, or the program code is further executable to: receive a search query that comprises a weight for each of at least some of the fields; rank search results based on the weights comprised in the search query; and return the ranked search results.

In some embodiments, the search query is received from a chatbot while the chatbot converses with a user; the search query comprises one or more messages transmitted between the chatbot and the user; and the returned search results comprise the reference to the electronic document, such that the chatbot is enabled to offer the reference to the electronic document to the user as a resolution of a problem presented by the user.

In some embodiments, the search query is received from a chat system operated by a human agent, while the human agent converses with a user; the search query comprises one or more messages transmitted between the human agent and the user; and the returned search results comprise the reference to the electronic document, such that the human agent is enabled to offer the reference to the electronic document to the user as a resolution of a problem presented by the user.

In some embodiments, the reference to the electronic document comprises a Uniform Resource Identifier (URI) of the electronic document.

In some embodiments, the calculation of the importance score for each of the multiple messages is based on contents of each of the multiple messages.

In some embodiments, the calculation of the importance score for each of the multiple messages is based on an order of the multiple messages inside the respective conversation text.

In some embodiments, the clustering is based on contents of the multiple messages.

In some embodiments, the enrichment of the electronic document or the record with the aggregated importance scores comprises: implicitly adding the aggregated importance scores to the electronic document or the record, by naming, numbering, or orderly positioning the added fields in a sequence reflecting their aggregated importance scores.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A technique to enrich electronic documents with related conversation texts is disclosed herein. The technique may be embodied in a method, system, and computer program product. The enriched electronic documents, when subsequently searched by an information retrieval (IR) system, enable the IR system to return more relevant results.

The technique is based, inter alia, on an analysis of conversation texts, such as those from computerized chat systems, to determine which electronic documents can be enriched, with what texts, and in what manner. Customer service chats of various types are especially suitable for this task. These chats, typically conducted with a human customer on one side and a human or a computerized ("chatbot") agent on the other side, often include messages that describe a problem faced by the customer, as well as a reference (such as a link) to a document that provides resolution of the problem—typically provided by the agent. For example, following some messages exchanged between a customer and an agent, the agent may provide the customer with a link to a web page that includes information on how to resolve the problem. Accordingly, in order to enrich a certain electronic document, texts of multiple different conversations that all reference the same electronic document, are obtained. These different texts will typically include different descriptions of the same problem, because different people usually choose different words to explain their issue, or they may even describe completely different symptoms that still stem from the same problem that is finally diagnosed by the agent who provided the reference to the electronic document.

The analysis of these conversation texts may include the calculation of an importance score for each of the messages in each of the conversation texts. This score indicates the relative importance or relevance of each message to the problem. For instance, the messages "Good morning John, how may I assist you today?" and "Hi, I need some help" may be attributed a low importance score, while the more informational message "I need help configuring the network interface of my IBM z15 mainframe" may be attributed a high one.

The analysis may further include clustering the messages from all conversation texts into different bins. Various clustering techniques may be employed to achieve this.

Then, an aggregated importance score may be calculated for each of the bins, based on the importance scores of the messages contained in the respective bin.

Finally, the electronic document that was referenced by all the analyzed conversation texts may be enriched with at least some of the bins and with their aggregated importance scores. Namely, the electronic document will include the textual contents of the messages of the different bins. Optionally, the bins are added to the electronic document as separate "fields," to enable an IR system to differentially weigh findings from different fields.

A large number of electronic documents and conversation texts that reference them may be processed in the same manner, to enrich all these electronic documents with texts from relevant conversations.

Later, in response to a query, an IR system associated with the corpus of these enriched electronic documents may search not only in the original texts of the documents, but also in the fields with which the electronic documents have been enriched. Practically, this often means that the IR system searches an index of that corpus which it created previously, where this index includes a textual representation of each of the electronic documents in the corpus.

Such use of an IR system may prove particularly useful, for example, to automatically generate and/or execute a query during a new conversation between a customer and an agent, with one or more of the messages of the conversation serving as the query (or as a part thereof). Since it is likely that the message(s) serving as the query will have some resemblance to messages from past conversations discussing the same problem, such search may yield an enriched electronic document which includes a similar message in one of its fields. This enriched electronic document, very probably, provides a resolution to the problem faced by the customer in the new conversation, in the same way it provided a resolution in earlier, similar conversations.

In the following description of the figures, the word "electronic" is omitted from the terms "electronic document" and "enriched electronic document," merely for reasons of brevity. It is intended that these terms cover any and all types of electronic documents, such as PDF (Portable Document Format) files, word processor files, plain text files, HTML files, XML (Extensible Markup Language) files, image files, audio files, video files, etc.

Figure 1:
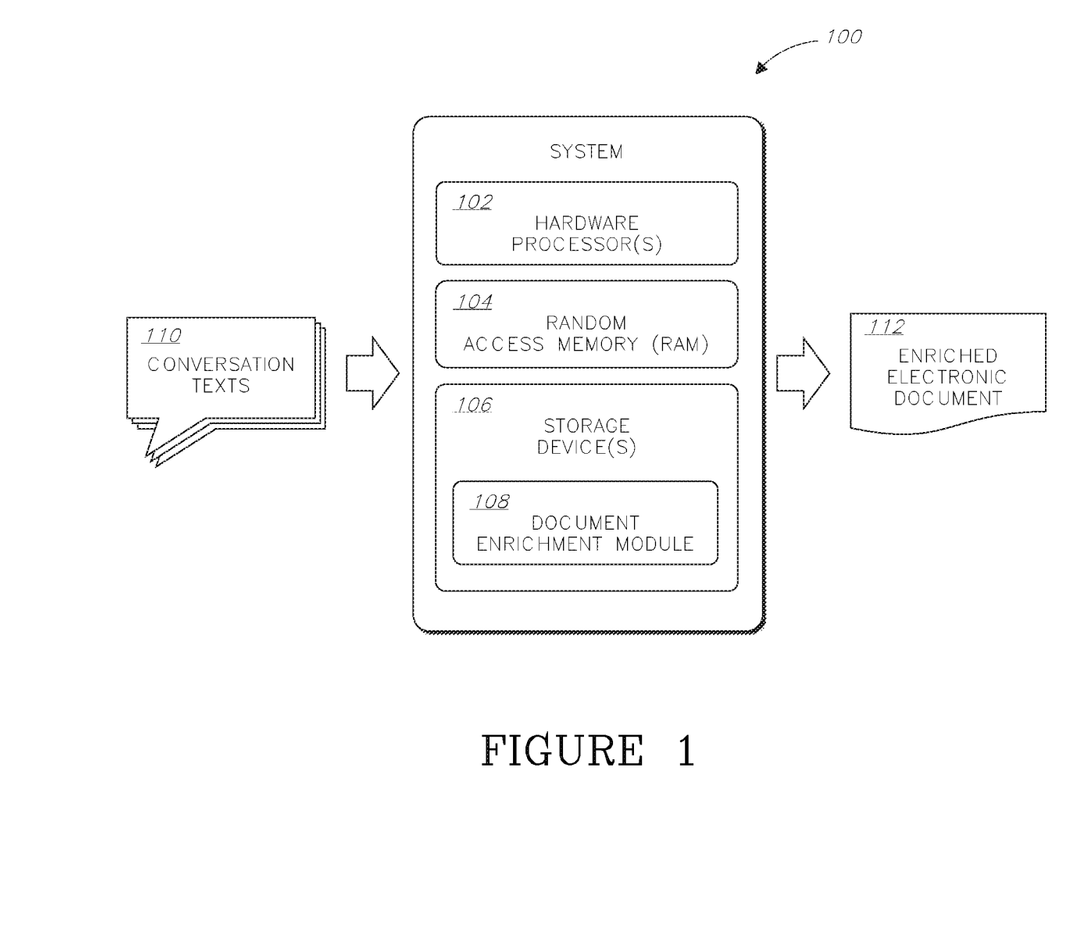
FIG. 1 is a block diagram of an exemplary system for document enrichment, according to an embodiment.

Reference is now made to FIG. 1, which shows a block diagram of an exemplary system 100 for document enrichment, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a document enrichment module 108. The software components may include an operating system having various software components and/or drivers for controlling and managing general system tasks (e.g., memory management, storage device control, power management, etc.), and facilitating communication between various hardware and software components.

System 100 may operate by loading instructions of document enrichment module 108 into RAM 104 as they are being executed by processor(s) 102. The instructions of document enrichment module 108 may cause system 100 to receive multiple conversation texts 110, process them, and output an enriched document 112.

System 100, as described herein, is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Components of system 100 may be co-located or distributed (e.g., in a distributed computing architecture).

The instructions of document enrichment module 108 are now discussed with reference to the flowchart of FIG. 2, which illustrates a method for document enrichment, in accordance with an embodiment.

Steps of the illustrated method may either be performed in the order they are presented or in a different order (or even in parallel), as long as the order allows for a necessary input to a certain step to be obtained from an output of an earlier step. In addition, the steps of the illustrated method are performed automatically (e.g., by system 100 of FIG. 1), unless specifically stated otherwise.

In step 200, multiple conversation texts may be obtained (one text per conversation). Each of the conversation texts may include multiple messages authored by multiple parties (such as two or more parties) during a single conversation (also "session"). The parties (also "users" or "participants") may be, for example, a human customer, a human agent, a computerized agent (also referred to as a "chatbot"), or any combination thereof, including a multiplicity of participants having a similar role. Generally, any conversation between any two or more parties is intended herein. The conversations may be originally textual (such as those facilitated by a computerized text chat system), or voice conversations that were transcribed by suitable speech recognition software.

Each of the conversation texts may further include a reference to an electronic document that provides resolution of a problem that is common to all the conversations. The reference may be in the form of a link, such as an HTML anchor tag having a URL (Uniform Resource Locator) of the document as its target. More generally, the reference may be any type of URI (Uniform Resource Identifier) that uniquely identifies and/or links to the document, wherever it may be stored.

The figure illustrates, in step 200, two exemplary conversations, labeled "Conversation A" and "Conversation B." Each of these conversations includes, as its text, multiple messages (labeled "A1" through "A5" and "B1" through "B3," respectively) exchanged between two parties, and a final message which includes a link to the URL of the document which provides the resolution. The link, of course, does not necessarily appear in the final message of each conversation, although typically it is provided by the agent relatively late in the conversation, after the problem has been sufficiently diagnosed.

In step 202, an importance score for each of the multiple messages of all the conversation texts may be calculated, in order to later allow an IR system to attribute different weights to different messages based on their importance.

The importance score may be calculated in one of various manners. A relatively naïve approach is to score the messages based on their order of appearance in each of the conversations. For example, as illustrated for Conversation A, messages appearing early in the conversation may be attributed a medium score (if it is believed they are likely to contain very general or general problem descriptions, and possibly some pleasantries), those appearing in the middle of the conversation may be attributed a low score (if it is believed they are likely to contain confusing or misleading troubleshooting attempts), and those appearing late in the conversation may be attributed a high score (if it is believed they are likely to include the final and correct steps of the troubleshooting). As illustrated for Conversation A, messages are scored according to a certain parabolic function that expressed the above beliefs. Similarly, any other type of score calculation as a function of the order of messages may be used. The suitable function may be determined using statistical and/or machine learning approaches; for example, statistical and/or machine learning analysis may be performed on a large number of messages (e.g., at least hundreds, and optionally thousands or more) that are manually labeled with importance score and automatically labeled with their order in the respective conversation, to detect a pattern (convertible to a suitable function) of order-dependent importance.

Another approach for calculating the importance scores may be based on the contents of the messages. For example, a machine learning classifier may be trained on a large number of messages (e.g., at least hundreds, and optionally thousands or more) that are manually labeled with importance scores, so that the classifier can later receive a new message as input, and output an estimated importance score. The manual labeling may attribute a relatively low (or even zero) importance score to non-informative messages, such as those consisting of pleasantries or discussing issues that are not descriptive of the problem. Conversely, the manual labeling may attribute a relatively high importance score to messages that describe the problem in a clear and elaborate manner. The importance curve shown in association with Conversation B demonstrates an exemplary scoring function that is based on the contents of messages B1 through B3.

Optionally, the calculation of the importance scores may be based on a combination of the approaches discussed above.

Alternatively, the importance scores may be calculated using any other method or algorithm that is deemed suitable for reliably estimating the importance of the type of pertinent messages.

In a step 204, the messages of all the conversation texts may be clustered into multiple bins. Various clustering techniques may be used. For example, the clustering may include an analysis of the contents of the messages, to locate similarities that justify clustering certain messages in the same bin. Any known text similarity detection algorithm may be used, such as a rule-based algorithm or one based on machine learning. The figure shows, just as an example, that messages A4, A5, and B3 are clustered into Bin 1, messages A1 and B1 into Bin 2, and messages A2, A3, and B2 into Bin 3.

Step 204 may further include a calculation of an aggregated importance score for each of the bins, based on the importance scores of the messages contained in the respective bin. The aggregated importance score may be calculated, for example, as a simple average of the importance scores of the individual messages, or as a weighted average whose weights are pre-calculated by certain analysis. The figure illustrates, as an example, a relatively high aggregated importance score for Bin 1, a medium one for Bin 2, and a relatively low one for Bin 3. Optionally, the bins are numbered, named, or sorted in a sequence that reflects their aggregated importance score, as demonstrated in this figure.

Then, in step 206, the document that was referenced by all the conversation texts may be enriched with at least some of the bins, by adding the texts of the messages of these bins, as well as the aggregated importance scores of these bins, to the document. Optionally, each bin is added as a "field" to the document, and is marked as such using a markup scheme or any other known scheme that is suitable for the type of document. As known in the art, many IR systems as well as database systems, document storage systems, and other information storage systems, define a document as a collection of fields, each including its own contents. Accordingly, the enriched document may include its original content in one or more fields (one exemplary field is shown as "Field 0" in the figure), and the added bins in additional fields (labeled "Field 1" through "Field 3").

The aggregated importance scores may optionally be added only implicitly, by numbering, naming, or orderly positioning the added fields in a sequence reflecting their aggregated importance score. For example, as shown in the figures, the fields are named "Field 1" through "Field 3," which reflects a high to low importance score.

Field 3 is shown in the figure as optional, serving as an example of a bin having a relatively low aggregated importance score and thus one which can be omitted, if desired, when enriching the document. Generally, in such omission regime, only bins having an aggregated importance score that is higher than a predefined threshold may be added to the document. Another possibility is to only add a limited, predefined number of bins having the highest aggregated importance scores.

Figure 2:
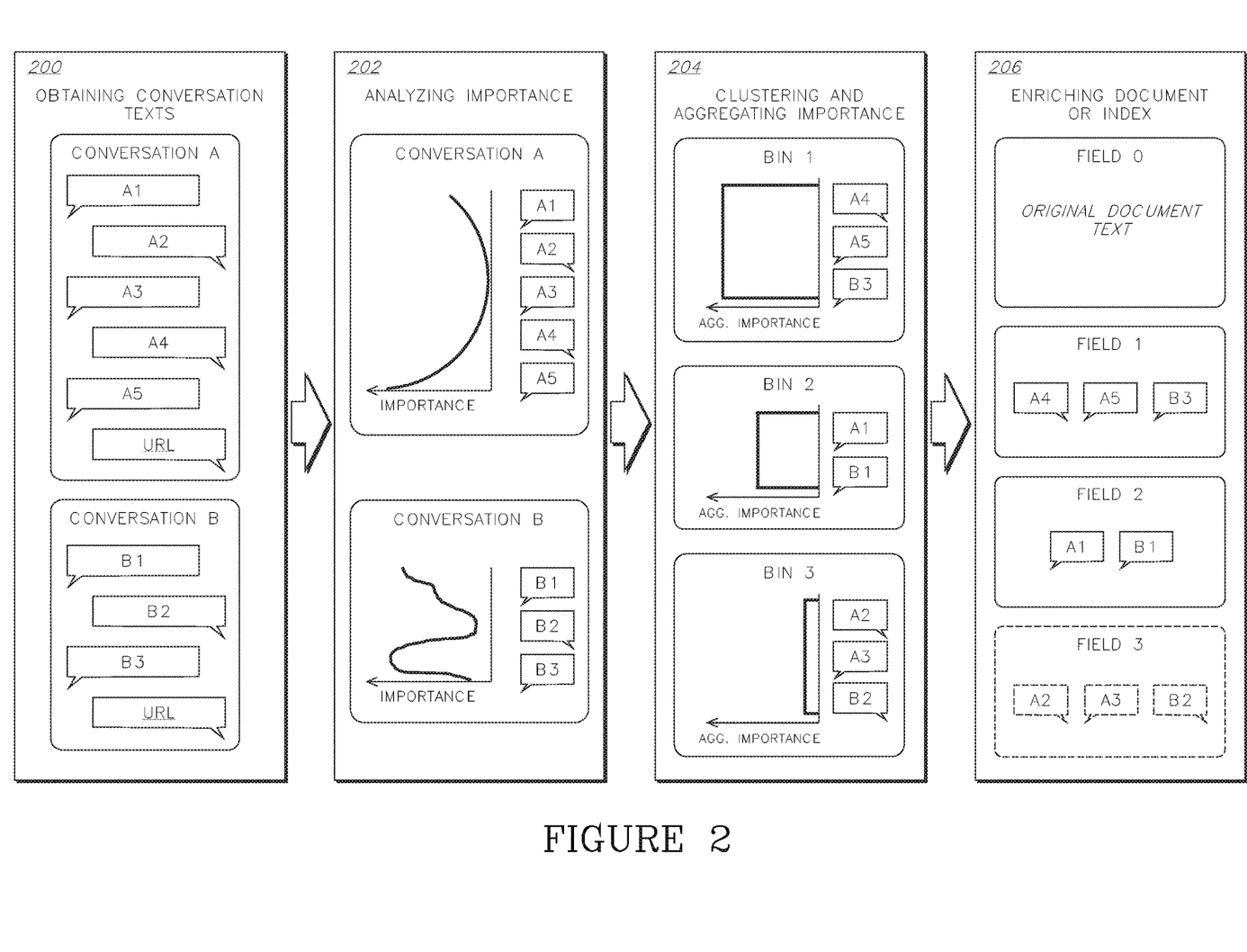
FIG. 2 is a flowchart of an exemplary method for document enrichment, according to an embodiment.

Advantageously, the steps of the method of FIG. 2 may be repeated for a large number of historical conversation texts collected from one or more computerized chat systems, thereby resulting in an enrichment of many documents referenced by these conversation tests. Then, when an IR system performs its periodic indexing of the corpus containing these documents (such as an organizational document storage, or even the World Wide Web), its index becomes updated with the textual contents of the enriched documents, including the added fields.

As an alternative to enriching the documents, enrichment can be made only of the records of these documents in the index maintained by the IR system. For instance, the person or organization employing the present enrichment technique may lack editorial access to some or all documents in a certain corpus, or may prefer not to edit the documents for another reason. In such cases, step 206 is altered so that it adds the bins (optionally as fields) only to the record of the document in the index.

Regardless of whether the enrichment is of the documents or just of their index records, the enrichment enables the IR system to respond to later queries by searching also in the newly-added fields. This enhances the quality of search results returned by the IR system, because there is an increased chance that one or more of the added fields includes verbatim text from the query, or similar text.

The IR system may operate, for example, in accordance with the following IR method:

First, it periodically or continuously updates its index of documents, by crawling the corpus and fetching the contents (at least the textual contents) of the enriched documents. Alternatively, the IR system may be of a type operating without an index, and physically traversing all documents in the corpus whenever a query is executed; such systems are typically operated only in very small corpora, such as local searches made in the storage of a personal computer or a portable computing device.

Second, the IR system receives, from a client, a query comprising at least one or more keywords; although the query can be a simple sentence such as "IBM z15 network configuration," the existence of enriched documents allows for more sophisticated queries, such as field-weighted (also "field-boosted") queries. A field-weighted query, as known in the art, is one which includes both one or more keywords, as well as a designation of a weight (also "boost factor") that should be given to each of multiple fields in the searched documents. For example, the following query syntax may be acceptable by the Elasticsearch IR system available from Elastic N.V. of the Netherlands:

```
GET /_search
{
    "query": {
        "query_string" : {
            "fields" : ["content", "field1^3", "field2^1.5"],
            "query" : "IBM z15 network configuration"
        }
    }
}
```

In this exemplary query, the multi-keyword term "IBM z15 network configuration" is searched in three fields: content, field1, and field2. The content field, which contains the original content of the searched documents, is not given any boost, and thus retains a default boost factor of ×1. field1, which has a high aggregated importance score (according to the example given in FIG. 2), is boosted by a factor of ×3. Finally, field2, which has a lower aggregated importance score, is boosted only by a factor of ×1.5.

Other suitable query syntaxes may be used in other IR systems that support field-weighted queries. A query may refer to any number of fields and any level of boosting (or lack thereof) for each field, as decided and defined by a designer or an administrator of the IR system.

Third, the IR system executes a search in the index (or, less commonly, in the document storage itself, as mentioned above), in accordance with any conventional searching technique or algorithm known in the art. As the IR system ranks the documents that will be returned as search results to the client, it takes into account the weights defined for the various fields in the query, as known in the art.

The number of documents in the returned search results may be predefined in the IR system (or in the query), and may range from one (just the highest-ranking document) to numerous documents that are sorted by their ranks (typically from high to low).

The present document enrichment technique and its associated IR method may prove particularly useful in computerized chat systems, where a query may be executed during a new conversation between a customer and an agent, with one or more of the messages of the conversation serving as the query (or as a part thereof). Since it is likely that the message(s) serving as the query will have some resemblance to messages from past conversations discussing the same problem, such search may return at least one enriched electronic document which includes a similar message in one of its fields. This enriched electronic document, very probably, provides a resolution to the problem faced by the customer in the new conversation, the same way it provided a resolution in earlier, similar conversations.

The use of the document enrichment technique and its associated IR method in the framework of a computerized chat system is now discussed with reference to FIG. 3. This figure shows a block diagram of the operation of an exemplary resolution assistance system 300 that may assist either a human agent or a chatbot to quickly and efficiently resolve a problem reported to them by a human customer.

Resolution assistance system 300 includes all software and hardware components required for its operation, such as those components discussed above in connection with system 100 of FIG. 1, except for replacing the document enrichment module with a resolution assistance module (not shown). This resolution assistance module may include program instructions that execute the following method: First, receive a query from a computerized chat system. Second, execute a search based on the query, and respond with one or more enriched documents relevant to the query.

For example, a conversation 302 between a human customer and a chatbot, shown on the left, may occur within a certain computerized chat system. At any point during conversation 302, the chatbot or the computerized chat system may automatically generate and transmit a query which includes one or more of the messages transmitted by either the human customer or the chatbot. For example, a query may be initiated for every message transmitted by the human customer, by the chatbot, or by either one. As another example, a query may be initiated after every X messages have been exchanged, and includes the texts of the Y previously-exchanged messages; X and Y may be the same or different numbers. As a further example, each exchanged message may undergo importance scoring, using a technique similar to the one discussed above with reference to FIG. 2, and only messages whose importance score is above a predefined threshold may be used as queries.

Each query is received by resolution assistance system 300, which executes it by itself (if it is configured to function as an IR system), or in another, suitable IR system. For instance, this may be an IR system of the organization operating the chatbot, which is able to search in a corpus of enriched technical documents providing information, guidance, troubleshooting, or solutions, to various problems typically faced by customers of the organization. The query is optionally a field-weighted query, as discussed above. The names of the fields and the weights attributed to them in the query may be predefined based on structure and contents of enriched documents stored in the pertinent corpus.

Resolution assistance system 300 may then respond with relevant search results, such as with one or more references to one or more enriched documents, respectively, that are likely to resolve the problem described by the human customer. Each reference may be in the form of a link that can direct the human customer to the enriched electronic document, such as by the document's URI or URL. The chatbot may then transmit to the human customer a message containing the reference (labeled "Resolution" in the figure) and explaining, using any suitable phrasing, that a possible solution to the problem may be found in the referenced document.

Accordingly, resolution assistance system 300 may enhance the operation of the chatbot, and endow it with increased artificial intelligence; the chatbot will be able to leverage successful problem resolutions in historical conversations in order to resolve a present problem.

Figure 3:
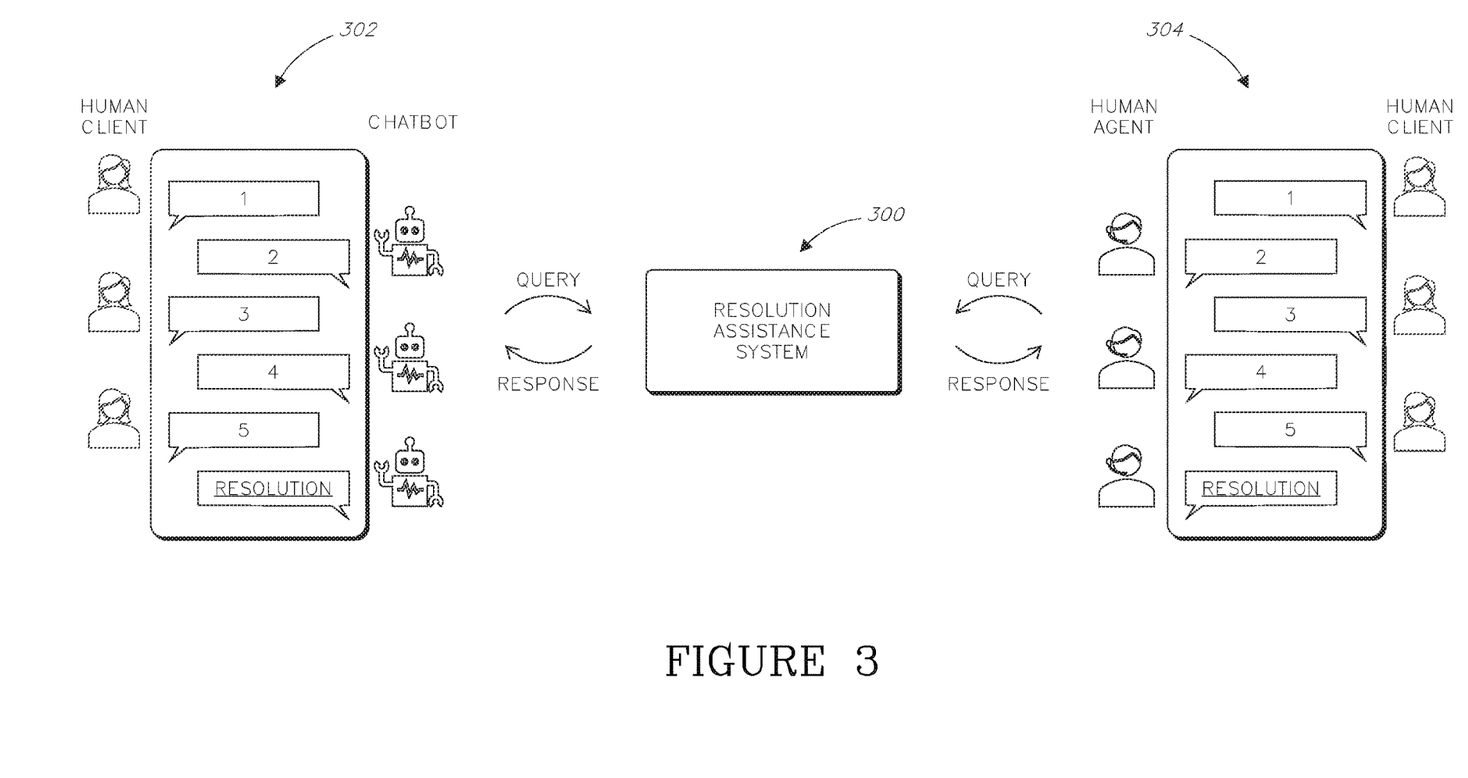
FIG. 3 is a block diagram illustrating the operation of an exemplary resolution assistance system, according to an embodiment

On the right of FIG. 3 there is shown another exemplary conversation 304, this time between a human customer and a human agent. As conversation 304 takes place, the computerized chat system facilitating conversation 304 may automatically generate and transmit a query which includes one or more of the messages transmitted by either the human customer or the human agent, similar to what has been described above with respect to conversation 302. Alternatively, the human agent may manually trigger the generation and transmission of a query during conversation 304, such as by marking, in a GUI (Graphical User Interface) of the computerized chat system, which message(s) from conversation 304 to include in such query.

Each query is received by resolution assistance system 300, which executes it in a suitable IR system and responds with relevant search results, as described above with respect to conversation 302. Each reference to an enriched document returned by resolution assistance system 300 may first be displayed to the human agent, who can choose whether to review the enriched document and ensure it provides a suitable solution to the problem described by the human customer. The human agent may then transmit the reference to the human customer in a message, along with an explanation, using any suitable phrasing, that a possible solution to the problem may be found in the referenced document. Alternatively, the human agent may use the information contained in the enriched document to formulate his or her own informational message(s) to the human customer, in an attempt to solve the problem.

Accordingly, resolution assistance system 300 may also improve the work of human agents, by effortlessly exposing them, in real time, to documents including solutions to what might be the same or a similar problem resolved in historical conversations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising operating at least one hardware processor to automatically:
    obtain multiple conversation texts, one text per conversation, wherein each of the multiple conversation texts comprises:
        multiple messages authored by multiple parties, and
        a reference to an electronic document that provides resolution of a problem that is common to all the conversations;
    calculate an importance score for each of the multiple messages of all the conversation texts;
    cluster the multiple messages of all the conversation texts into multiple bins;
    calculate an aggregated importance score for each of the multiple bins, based on the importance scores of the messages contained in the respective bin; and
    enrich (a) the electronic document, or (b) a record of the electronic document in an index of electronic documents, with at least some of the multiple bins and their aggregated importance scores, wherein the at least some of the multiple bins are added as fields to the electronic document or to the record.

2. The method of claim 1, further comprising, in an information retrieval system:
receiving a search query that comprises a weight for each of at least some of the fields;
ranking search results based on the weights comprised in the search query; and
returning the ranked search results.

3. The method of claim 2, wherein:
the search query is received from a chatbot while the chatbot converses with a user;
the search query comprises one or more messages transmitted between the chatbot and the user; and
the returned search results comprise the reference to the electronic document, such that the chatbot is enabled to offer the reference to the electronic document to the user as a resolution of a problem presented by the user.

4. The method of claim 2, wherein:
the search query is received from a chat system operated by a human agent, while the human agent converses with a user;
the search query comprises one or more messages transmitted between the human agent and the user; and
the returned search results comprise the reference to the electronic document, such that the human agent is enabled to offer the reference to the electronic document to the user as a resolution of a problem presented by the user.

5. The method of claim 1, wherein the reference to the electronic document comprises a Uniform Resource Identifier (URI) of the electronic document.

6. The method of claim 1, wherein the calculation of the importance score for each of the multiple messages is based on contents of each of the multiple messages.

7. The method of claim 1, wherein the calculation of the importance score for each of the multiple messages is based on an order of the multiple messages inside the respective conversation text.

8. The method of claim 1, wherein the clustering is based on contents of the multiple messages.

9. The method of claim 1, wherein the enrichment of the electronic document or the record with the aggregated importance scores comprises:
implicitly adding the aggregated importance scores to the electronic document or the record, by—
naming,
numbering, or
orderly positioning
the added fields in a sequence reflecting their aggregated importance scores.

10. A system comprising:
(a) at least one hardware processor; and
(b) a non-transitory computer-readable storage medium having program code embodied therewith, the program code executable by said at least one hardware processor to:
obtain multiple conversation texts, one text per conversation, wherein each of the multiple conversation texts comprises:
multiple messages authored by multiple parties, and
a reference to an electronic document that provides resolution of a problem that is common to all the conversations;
calculate an importance score for each of the multiple messages of all the conversation texts;
cluster the multiple messages of all the conversation texts into multiple bins;
calculate an aggregated importance score for each of the multiple bins, based on the importance scores of the messages contained in the respective bin; and
enrich (a) the electronic document, or (b) a record of the electronic document in an index of electronic documents, with at least some of the multiple bins and their aggregated importance scores, wherein the at least some of the multiple bins are added as fields to the electronic document or to the record.

11. The system of claim 10, wherein the reference to the electronic document comprises a Uniform Resource Identifier (URI) of the electronic document.

12. The system of claim 10, wherein the calculation of the importance score for each of the multiple messages is based on contents of each of the multiple messages.

13. The system of claim 10, wherein the calculation of the importance score for each of the multiple messages is based on an order of the multiple messages inside the respective conversation text.

14. The system of claim 10, wherein the clustering is based on contents of the multiple messages.

15. A computer program product comprising a non-transitory computer-readable storage medium having program code embodied therewith, the program code executable by at least one hardware processor to:
obtain multiple conversation texts, one text per conversation, wherein each of the multiple conversation texts comprises:
multiple messages authored by multiple parties, and
a reference to an electronic document that provides resolution of a problem that is common to all the conversations;
calculate an importance score for each of the multiple messages of all the conversation texts;
cluster the multiple messages of all the conversation texts into multiple bins;
calculate an aggregated importance score for each of the multiple bins, based on the importance scores of the messages contained in the respective bin; and
enrich (a) the electronic document, or (b) a record of the electronic document in an index of electronic documents, with at least some of the multiple bins and their aggregated importance scores, wherein the at least some of the multiple bins are added as fields to the electronic document or to the record.

16. The computer program product of claim 15, wherein the reference to the electronic document comprises a Uniform Resource Identifier (URI) of the electronic document.

17. The computer program product of claim 15, wherein the calculation of the importance score for each of the multiple messages is based on contents of each of the multiple messages.

18. The computer program product of claim 15, wherein the calculation of the importance score for each of the multiple messages is based on an order of the multiple messages inside the respective conversation text.

19. The computer program product of claim 15, wherein the clustering is based on contents of the multiple messages.

* * * * *